United States Patent
Qu et al.

(10) Patent No.: US 8,454,080 B2
(45) Date of Patent: Jun. 4, 2013

(54) BUMPER BEAM WITH LOAD TRANSFERRING SECTION

(75) Inventors: Yi Qu, Troy, MI (US); Edgar Edward Donabedian, Livonia, MI (US); Kevin Gustafson, S. Rockwood, MI (US); Kenneth R. Schmidt, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/235,925

(22) Filed: Sep. 19, 2011

(65) Prior Publication Data

US 2013/0069377 A1 Mar. 21, 2013

(51) Int. Cl.
*B60R 19/34* (2006.01)
(52) U.S. Cl.
USPC .................... 296/187.1; 293/133; 293/154
(58) Field of Classification Search
USPC .............. 296/187.09, 187.1; 293/102, 114, 293/121, 122, 126, 133, 154
See application file for complete search history.

(56) References Cited

U.S. PATENT DOCUMENTS

| | | | |
|---|---|---|---|
| 4,422,680 A | | 12/1983 | Goupy |
| 4,626,011 A | * | 12/1986 | Gauthier ................. 293/120 |
| 6,179,353 B1 | | 1/2001 | Heatherington et al. |
| 6,685,243 B1 | * | 2/2004 | Evans ..................... 293/102 |
| 6,846,026 B2 | | 1/2005 | Detwiler et al. |
| 6,866,115 B2 | * | 3/2005 | Miyasaka ................ 180/311 |
| 6,932,398 B2 | | 8/2005 | Frank |
| 6,994,374 B2 | * | 2/2006 | Miyasaka ................ 280/784 |
| 7,080,862 B2 | | 7/2006 | Suzuki et al. |
| 7,559,589 B2 | | 7/2009 | Nees |

(Continued)

FOREIGN PATENT DOCUMENTS

JP 2003048498 A * 2/2003

OTHER PUBLICATIONS

Charles Y. Warner, et al., SAE Technical Paper Series, Load Path Considerations for Side Crash Compatibility, 2007-01-1176, Reprinted From: Vehicle Aggressivity & Compatibility in Automotive Crashes, 2007 (SP-2136).
Charles Y. Warner, et al. SAE International, Load Path Considerations for Side Crash Compatibility, 2007-01-1176, Published Apr. 16, 2007.
RCAR Bumper Test, RCAR Research Council for Automobile Repairs, Issue 2.0, Sep. 2010.

*Primary Examiner* — Jason S Morrow
(74) *Attorney, Agent, or Firm* — Jason Rogers; Brooks Kushman P.C.

(57) ABSTRACT

A motor vehicle includes a frame with energy-absorbing zones at outboard corners of the vehicle and a bumper beam mounted to the energy-absorbing zones to transfer force to at least one of the energy-absorbing zones during a collision. The bumper beam includes a center section extending generally laterally across the vehicle between the energy-absorbing zones, and left and right load transfer sections attached to outboard ends of the center section. Each load transfer section extends outboard and rearward such that the free end of each load transfer section is disposed outboard of the frame adjacent a rear end of its respective energy-absorbing zone. In a small-overlap collision, the load transfer section on the side of the impact bends rearward as the energy-absorbing zone deforms, and the free end of the load transfer section contacts the frame to transfer crash loads to the frame.

20 Claims, 2 Drawing Sheets

U.S. PATENT DOCUMENTS

| | | | |
|---|---|---|---|
| 7,819,218 B2 * | 10/2010 | Eichberger et al. | 180/274 |
| 2001/0024053 A1 * | 9/2001 | Takase et al. | 296/189 |
| 2005/0236850 A1 | 10/2005 | Evans et al. | |
| 2007/0063521 A1 * | 3/2007 | Lancashire et al. | 293/102 |
| 2007/0176443 A1 * | 8/2007 | Yasuhara et al. | 293/133 |
| 2009/0160204 A1 | 6/2009 | Czopek et al. | |
| 2010/0244473 A1 * | 9/2010 | Sugimoto et al. | 293/154 |
| 2011/0133512 A1 * | 6/2011 | Mildner et al. | 296/187.09 |

* cited by examiner

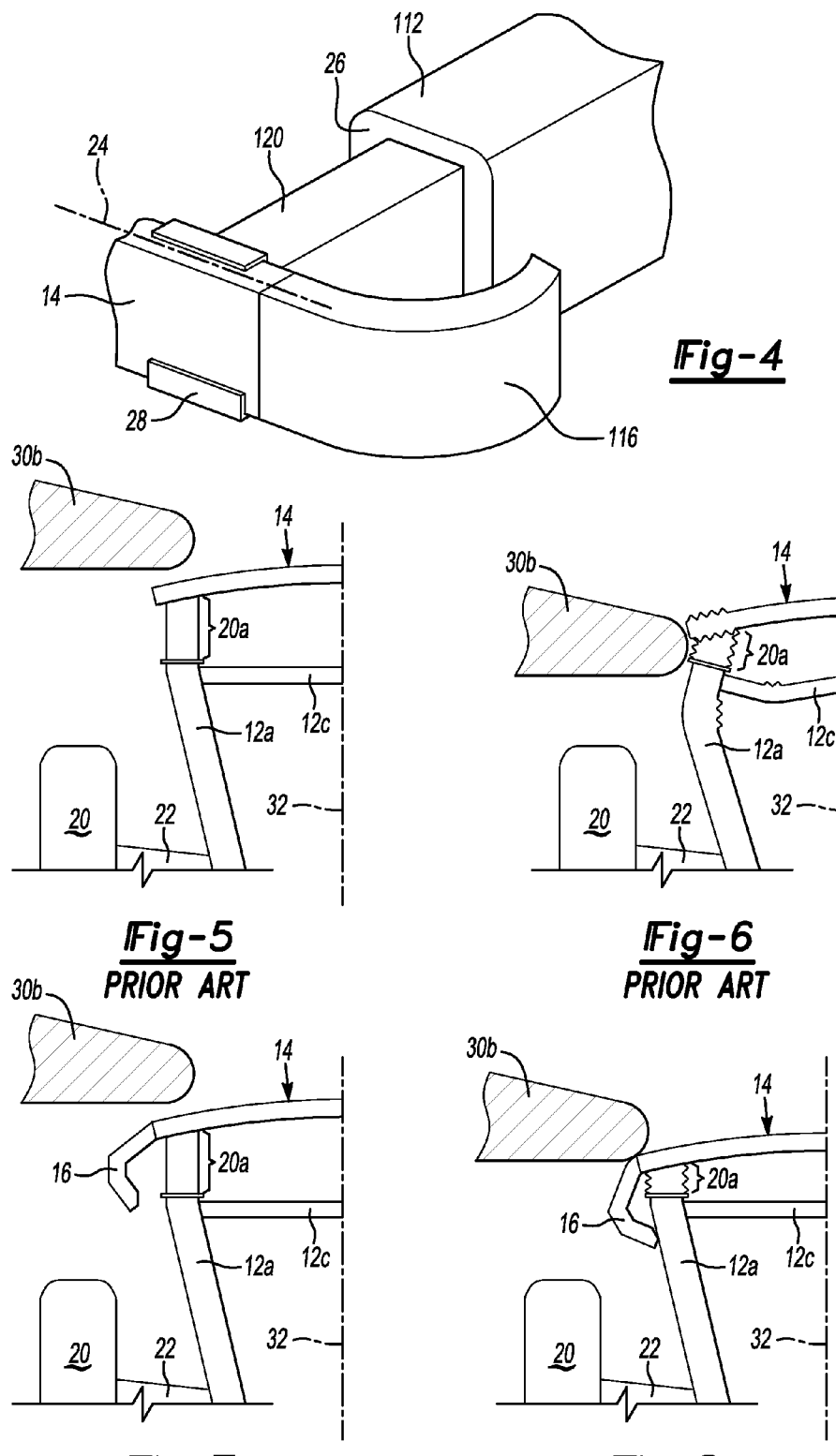

BUMPER BEAM WITH LOAD TRANSFERRING SECTION

TECHNICAL FIELD

The present invention relates to crash protection bumpers for motor vehicles, and more particularly to a bumper beam having outboard sections that transfer impact loads to the vehicle frame during a crash event.

BACKGROUND

Most motor vehicles are equipped with bumper systems (both front and rear) intended to protect vehicle occupants against injury (and also protect the vehicle against unnecessary damage) during a crash event. By absorbing some amount of the kinetic energy of the crash, a bumper system reduces the peak deceleration of the vehicle as well as the vehicle crash intrusion, which can help to reduce the likelihood and/or severity of injury to occupants during a crash event.

A typical front bumper system includes a laterally extending bumper beam attached to the forward portion of the vehicle frame and/or body structure. Energy-absorbing components or zones are located at and/or immediately behind the bumper beam where it is supported by the frame. These energy-absorbing components or zones are generally designed to plastically deform under compression during a high-speed impact, bending or buckling in order to absorb the crash energy. In some cases, the energy-absorbing zones are provided by separate components located between the bumper beam and the vehicle. Such separately-formed components that function by energy-absorbing are often referred to as energy-absorbing cans. It is also known to provide a deformable zone integrally formed with one or more of the vehicle frame components, usually immediately adjacent to the bumper.

It is also known to provide energy-absorbing devices that employ springs, pneumatics, or hydraulics.

In a full frontal crash in which the crash loads are applied to the bumper beam in a left/right symmetrical fashion, both the left and right energy-absorbing zones are involved and able to absorb energy. In most "real world" vehicle collisions, however, the impact is offset to one side of the vehicle, in which case (depending on the amount of offset) all or most of the impact is applied to the energy-absorbing zone on the side of the crash.

One type of crash that is particularly difficult to design for is when there is a large amount of offset between the vehicle and the other object involved in the collision, so that the impact is directly on (or outboard of) the point where the bumper beam is attached to the energy-absorbing zone. In this type of event, often referred to as "small overlap" impact, only a small portion of the bumper system or frame engages the other object, so that much less of the vehicle crash energy is able to be absorbed by the bumper system and/or frame. Designing a bumper system to perform well in this type of small overlap crash is difficult, particularly since a bumper system must be effective in a range of types/modes of crashes.

SUMMARY

According to one disclosed embodiment, a forward structure of a motor vehicle comprises a frame having first and second energy-absorbing zones at outboard corners of the vehicle. A bumper beam is mounted to the energy-absorbing zones to transfer force to at least one of the energy-absorbing zones during a collision. The bumper beam comprises a center section extending generally laterally across the vehicle between the energy-absorbing zones, and first and second load transfer sections attached to outboard ends of the center section adjacent the first and second energy-absorbing zones respectively. Each load transfer section extends outboard of its respective energy-absorbing zone and rearward with respect to an average curvature line of the bumper beam such that a free end of each load transfer section is disposed outboard of the frame adjacent a rear end of its respective energy-absorbing zone. In a large offset or small-overlap collision, the load transfer section on the side of the impact bends rearward as the energy-absorbing zone deforms, and the free end of the load transfer section contacts the frame (directly or indirectly) to transfer crash loads to the frame.

According to another disclosed embodiment, at least one of the load transfer sections extends inwardly toward its respective energy-absorbing zone adjacent the free end.

According to another disclosed embodiment, a bumper system for a motor vehicle comprises first and second crush cans adapted for mounting to a frame of the vehicle adjacent respective forward outboard corners of the frame. A bumper beam is mounted to forward ends of the crush cans and comprises a center section spanning the crush cans and first and second load transfer sections outboard of the respective crush cans. Each load transfer section extends outward and rearward from a forward end of its respective crush can and has a free end disposed adjacent to a rear end of its respective crush can.

According to another disclosed embodiment, a bumper system for an motor vehicle comprises a frame having an energy-absorbing zone that collapses under compressive loads, and a bumper beam mounted to the frame forward of the energy-absorbing zone. The bumper beam comprises a load transfer section extending outboard of the energy-absorbing zone and rearward to position a free end of the load transfer section outboard of and adjacent to a rear portion of the energy-absorbing zone, such that a rearward impact on the bumper beam causes the load transfer section to move rearward and contact the frame when the energy-absorbing zone collapses, thereby transfer loading from the impact to the frame at the point of contact.

BRIEF DESCRIPTION OF THE DRAWINGS

FIG. 4 shows an alternative embodiment of a load transfer section having a smoothly curved shape;

FIG. 5 is a schematic plan view showing a prior art bumper system prior to a small overlap crash event;

FIG. 6 is a schematic plan view showing the prior art bumper system of FIG. 5 during a small overlap crash event;

FIG. 7 is a schematic plan view showing a bumper system according to an embodiment of the invention prior to a small overlap crash event; and FIG. 8 is a schematic plan view showing the bumper system of FIG. 7 during a small overlap crash event.

DETAILED DESCRIPTION

Figure 1:
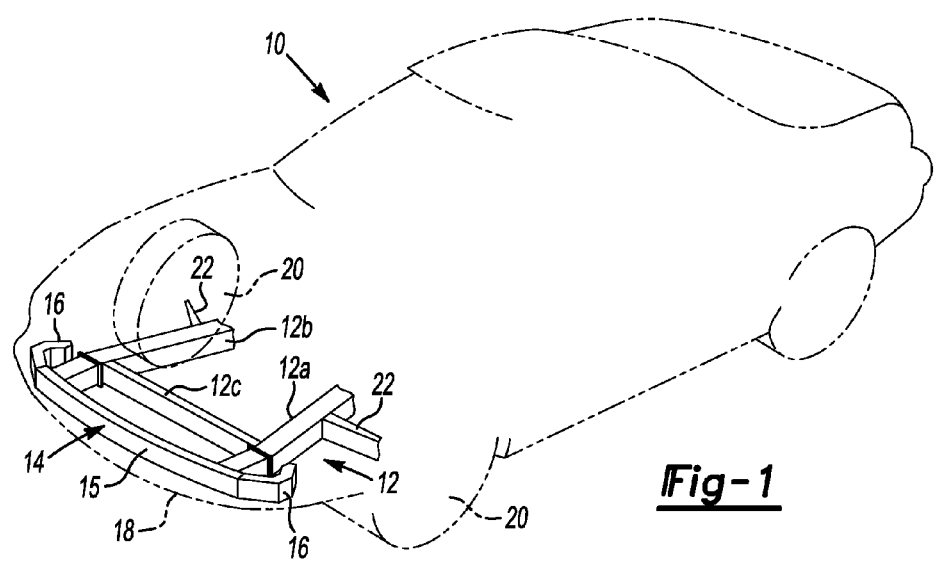
FIG. 1 is a schematic perspective view of the forward portion of a vehicle having a bumper system according to an embodiment of the invention.
Figure 2:
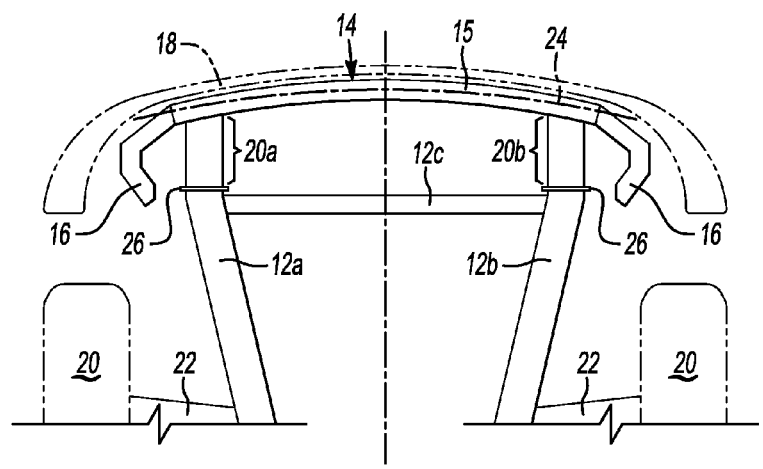
FIG. 2 is a schematic plan view of the bumper system of FIG. 1.

Referring to FIGS. 1 and 2, a motor vehicle, generally indicated by reference numeral 10, is shown to include a frame 12 and a forward bumper beam 14. A bumper fascia 18 (shown in phantom lines in FIGS. 1 and 2) extends across the width of the vehicle in front of the bumper beam 14. Also generally indicated are front wheels/tires 20 and suspension members 22, which are usually supported by frame 12.

As is well known in the automotive field, frame 12 may be part of a body-on-frame construction or of a unit-body construction, or any hybrid or combination of the two. The term "frame," as used herein, refers to any part or parts of the vehicle structure serving as a primary load-bearing component. In the illustrated embodiment, frame 12 includes left and right forward frame members 12a and 12b extending generally longitudinal with respect to the vehicle body, and a transverse frame member 12c. This is a schematic depiction only, and it will be apparent to a person of skill in the art that a vehicle frame, whether it be a body-on-frame or a unit body, may not take the exact form shown and discussed here. A vehicle frame may, for example, include more or fewer discrete components than are illustrated.

The frame components 12a-12c and bumper beam 14 may be formed of any appropriate high-strength material such as steel, aluminum, or composite materials, or any combinations thereof. Components 12a-12c and 14 may be of any appropriate cross-section (closed or open), and may be joined by welds, bolts, rivets, and/or adhesives depending upon the material from which they are formed and other well-known engineering design considerations.

Forward bumper beam 14 is, in the exemplary embodiment depicted, attached to the forward ends of left and right frame members 12a, 12b adjacent to the forward outboard corners of the vehicle. The portions of frame members 12a, 12b immediately behind bumper beam 14, constitute energy-absorbing zones 20a, 20b (see FIG. 2). Energy-absorbing zones 20a, 20b may be integrally formed with their respective frame members 12a, 12b or may, as is well known in the art, be separately-formed components attached to the frame during vehicle assembly. In either case, energy-absorbing zones 20a, 20b, are engineered to allow bumper beam 14 to move rearward relative to frame 12 during an impact on the bumper in a manner which absorbs or dissipates kinetic energy rather than transferring it to the frame.

The term "energy-absorbing zone" refers to any component and/or portion of the vehicle frame or body structure that absorbs kinetic energy during a crash event by deforming, compressing, yielding, bending, or any other type of mechanical or electromechanical energy conversion. An energy-absorbing zone may, for example, include springs, dampers, structural foam, or other compressible materials.

Bumper beam 14 comprises a center section 15 and load transfer sections 16 extending outwardly from the center section and rearward with respect to an average curvature line 24 of the bumper beam. Load transfer sections 16 may be formed integrally with center section 15 of bumper beam 14, but in the embodiment shown are fabricated separately from the center section and attached thereto by, for example, welding or bolted connections. Depending on the type of material from which load transfer sections 16 are made, it may be desirable (for manufacturability reasons) to construct each load transfer section 16 in two or more pieces which are attached to the center section 15.

Load transfer sections 16 curve or angle rearward from average curvature line 24 so that the free or distal ends of the sections are located outboard of the frame 12 and adjacent to the rear portions of energy-absorbing zones 20a, 20b. In the embodiment of the invention depicted in FIGS. 1-3, sections 16 are comprised of three short, relatively straight segments with distinct angled joints there between. This is only one possible configuration, and the multi-segment design is believed to be desirable for manufacturability if the sections are formed from high-strength steel believed appropriate for the purpose.

The depicted embodiment also shows that the outermost segment of each load transfer section 16 is angled inwardly relative to the longitudinal axis of the vehicle, so that the distal end is inboard of the outermost extent of the section. This configuration may help ensure that the distal end of load transfer section will contact the frame 12 and effectively transfer loads during a crash.

As seen in FIG. 4, a load transfer section 116 may be arc-shaped, describing a smoothly curved shape as it extends outward and rearward from bumper beam 14. The curvature of section 116 may be of constant or varying radius. Any curved or multi-segmented shape may be used that achieves the result of positioning the section distal end adjacent and outboard of the rearmost portion of the frame's energy-absorbing zone.

FIG. 4 also shows a crush can 120 attached to frame 12 by a mounting flange 26 and to bumper beam 14 by a mounting clamp 28.

Figure 3:
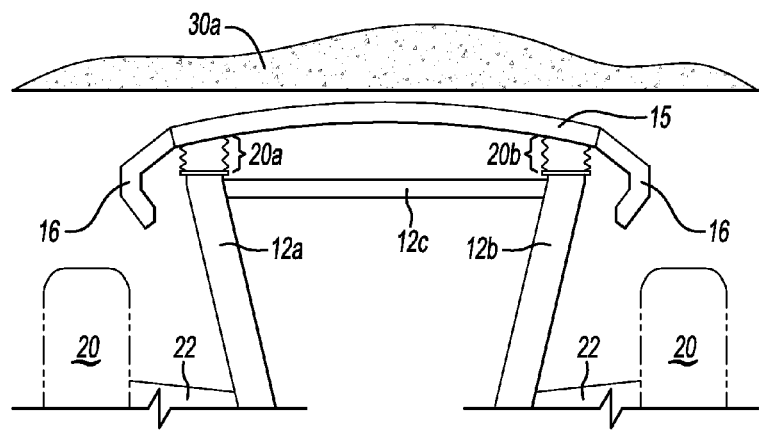
FIG. 3 is a schematic plan view showing the bumper system of FIG. 2 in a deformed condition after a flat barrier crash event.

Referring now to FIG. 3, a vehicle front-end structure is depicted during a crash event with a barrier 30a, such as may be used during a vehicle development crash test. The crash geometry depicted is referred to as a flat barrier crash because the barrier covers the entire cross car width of the test vehicle. During the crash test, the bumper 14 initially contacts the barrier at or near the vehicle longitudinal centerline 32, and as the energy absorbing zones 20a, 20b deform the bumper moves rearward relative to the rest of the vehicle. The distal end of the load transfer sections 16 are not connected to and do not come into contact with the frame components 12a-12c, therefore they do not affect, or interfere with, the energy absorbing zones 20a, 20b during the crash event. Energy-absorbing zones 20a, 20b are shown in a highly deformed condition, as is expected to result due to the engineered failure mode of the zone.

Referring now to FIG. 5, a prior art vehicle front-end structure that does not include a load transfer section is depicted prior to a crash event with a barrier 30b, such as may be used during a vehicle development crash test. The crash geometry depicted is referred to as a small overlap barrier crash because the barrier makes contact with the bumper beam 14 at a location that is well outboard of (offset from) the vehicle's longitudinal center-line 32, so that the load applied to the bumper beam must be borne primarily by frame member 12a.

Referring now to FIG. 6, the prior art vehicle front-end structure of FIG. 5 is depicted during a small overlap crash event with a barrier 30b. During the impact test, the minimal cross-car (lateral) overlap of the bumper 14 and the frame components 12a-12c may result in the car, and it components, being displaced in the transverse or lateral direction away from the barrier (to the right as viewed in FIG. 6) during the crash test. Such a misalignment may result in the frame components 12a-12c not absorbing all the crash energy, thereby requiring the vehicle components in the vicinity such as the wheel 20, suspension 22 and passenger compartment (not shown) to absorb the remainder of the loads.

Referring now to FIG. 7, a vehicle front-end structure according to an embodiment of the invention is depicted prior to a small-overlap crash event with a barrier 30b.

Referring now to FIG. 8, the vehicle front-end structure of FIG. 7 is depicted during a small overlap crash event, with a barrier 30b. As barrier 30b impacts bumper beam 14, the bumper beam begins to deform and move rearward with respect to the rest of the vehicle frame 12, crushing or collapsing energy-absorbing zone 20a. As load transfer section 16 moves rearward along with bumper beam 14 (and/or the section is bent rearward relative to the bumper beam by an impact directly on the load transfer section) its distal end contacts the outboard surface of frame member 12a. The shape of load transfer section 16 and its configuration relative to the other frame components are such that the distal end of the section transfers the impact loads to the frame at a location at or rearward of the rearmost portion of energy-absorbing zone 20a. During the small overlap crash event, as shown in FIG. 8, the distal end of load transfer section 16 transfers a significant amount of the impact loading into the frame at the contact point, thereby redirecting loads that would otherwise be borne by vehicle components in the vicinity of the wheel well and rearward, such as wheel 20, suspension 22 and passenger compartment (not shown).

Load transfer section 16 increases the overlap of the front bumper 14 to the barrier 30b, which may reduce transverse displacement of the bumper 14 and the frame components 12a-12c away from the barrier, during the crash test. Such a reduction in displacement will result in the frame components 12a-12 absorbing more crash energy, thereby reducing loads on the wheel 20, suspension 22 and passenger compartment.

Load transfer section 16 may deform to some degree, depending on the exact position and angle of the impact with barrier 30b, due to contact with the barrier and/or contact of the distal end with the frame 12a. Load transfer section 16 transfers crash impact loads to the frame which may cause some deformation of the frame in the area of contact if the crash is severe enough. Deformation of frame 12 generally benefits vehicle safety because it absorbs additional energy that would otherwise be transferred to the passenger compartment and/or occupants.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A forward structure of a motor vehicle comprising:
   a frame having first and second energy-absorbing zones located adjacent to respective first and second forward outboard corners of the vehicle; and
   a bumper beam forward of the energy-absorbing zones and mounted to transfer force to at least one of the energy-absorbing zones during a collision, the beam comprising:
      a center section extending generally laterally across the vehicle between the energy-absorbing zones; and
      first and second load transfer sections attached to and extending laterally outward from outboard ends of the center section adjacent the first and second energy-absorbing zones respectively, each load transfer section extending outboard of its respective energy-absorbing zone and rearward with respect to an average curvature line of the center section such that a free end of each load transfer section is disposed outboard of and spaced from the frame adjacent a rear end of its respective energy-absorbing zone.

2. The apparatus of claim 1 wherein at least one of the load transfer sections is fabricated separately from the center section and attached thereto during a stage of vehicle assembly.

3. The apparatus of claim 2 wherein the at least one load transfer section is fabricated in a plurality of pieces that are assembled to one another prior to or concurrent with being secured to center section.

4. The apparatus of claim 1 wherein at least one of the load transfer sections extends inwardly toward its respective energy-absorbing zone adjacent the free end.

5. The apparatus of claim 1 wherein at least one of the load transfer sections is comprised of a plurality of straight segments.

6. The apparatus of claim 1 wherein at least one of the load transfer sections is fabricated from high-strength steel.

7. The apparatus of claim 1 wherein at least one of the energy-absorbing zones is fabricated separately from a portion of the frame rearward of the energy-absorbing zone.

8. The apparatus of claim 1 wherein the first and second energy-absorbing zones are located at forward ends of first and second longitudinal frame members.

9. The apparatus of claim 1 wherein at least one of the energy-absorbing zones is designed to deform plastically under compressive loads during a crash.

10. A bumper system for a motor vehicle comprising:
    first and second crush cans adapted for mounting to a frame of the vehicle adjacent respective forward outboard corners of the frame; and
    a bumper beam mounted to forward ends of the crush cans and comprising a center section spanning the crush cans and first and second load transfer sections outboard of the respective crush cans and of respective outboard ends of the center section, each load transfer section extending outward and rearward from a forward end of its respective crush can and having a free end disposed adjacent to a rear end of its respective crush can.

11. The apparatus of claim 10 wherein at least one of the load transfer sections is fabricated separately from the center section and attached thereto during a stage of vehicle assembly.

12. The apparatus of claim 11 wherein the at least one load transfer section is fabricated in a plurality of pieces that are assembled to one another prior to or concurrent with being secured to center section.

13. The apparatus of claim 10 wherein at least one of the load transfer sections extends inwardly toward its respective energy-absorbing zone adjacent the free end.

14. The apparatus of claim 10 wherein at least one of the load transfer sections is comprised of a plurality of straight segments.

15. The apparatus of claim 10 wherein at least one of the load transfer sections is fabricated from high-strength steel.

16. A bumper system for an motor vehicle comprising:
    a frame having an energy-absorbing zone that collapses under compressive loads; and
    a bumper beam mounted to the frame forward of the energy-absorbing zone and comprising a load transfer section extending outboard of the energy-absorbing zone and forming an outboard-most portion of the bumper beam, the load transfer section extending rearward to position a free end of the load transfer section outboard of and adjacent to a rear portion of the energy-absorbing zone, such that a rearward impact on the bumper beam causes the load transfer section to move rearward and contact the frame when the energy-absorbing zone collapses, to transfer load from the impact to the frame.

17. The apparatus of claim 16 wherein the energy-absorbing zone comprises a crush can disposed between the bumper beam and a frame member.

18. The apparatus of claim 16 wherein at least one of the load transfer sections is fabricated separately from the center section and attached thereto during a stage of vehicle assembly.

19. The apparatus of claim 16 wherein at least one of the load transfer sections extends inwardly toward its respective energy-absorbing zone adjacent the free end.

20. The apparatus of claim 16 wherein at least one of the load transfer sections is comprised of a plurality of straight segments.

* * * * *